United States Patent
Gerard

(10) Patent No.: US 7,399,544 B2
(45) Date of Patent: Jul. 15, 2008

(54) DEVICE FOR RECUPERATING WATER IN A POWER PRODUCTION UNIT COMPRISING A FUEL CELL

(75) Inventor: David Gerard, Paris (FR)

(73) Assignee: Renault S.A.S., Boulogne Billancourt (FR)

( * ) Notice: Subject to any disclaimer, the term of this patent is extended or adjusted under 35 U.S.C. 154(b) by 26 days.

(21) Appl. No.: 10/534,499

(22) PCT Filed: Oct. 7, 2003

(86) PCT No.: PCT/FR03/02944

§ 371 (c)(1),
(2), (4) Date: Jan. 11, 2006

(87) PCT Pub. No.: WO2004/034496

PCT Pub. Date: Apr. 22, 2004

(65) Prior Publication Data

US 2006/0134471 A1    Jun. 22, 2006

(30) Foreign Application Priority Data

Oct. 10, 2002    (FR) .................................. 02 12580

(51) Int. Cl.
*H01M 8/04*    (2006.01)

(52) U.S. Cl. ............................. 429/26; 429/13; 429/34

(58) Field of Classification Search .............. 429/12–46
See application file for complete search history.

(56) References Cited

U.S. PATENT DOCUMENTS

| 4,087,976 A | | 5/1978 | Morrow, Jr. et al. ............. 60/643 |
| 5,958,614 A | * | 9/1999 | Takei et al. .................... 429/26 |
| 6,128,909 A | * | 10/2000 | Jonqueres ....................... 62/87 |
| 6,316,134 B1 | * | 11/2001 | Cownden et al. .............. 429/19 |
| 6,363,731 B1 | | 4/2002 | Konrad et al. .................. 62/87 |

FOREIGN PATENT DOCUMENTS

| DE | 100 18 067 | 10/2001 |
| EP | 0 850 800 | 7/1998 |

* cited by examiner

*Primary Examiner*—Susy Tsang-Foster
*Assistant Examiner*—Maria J Laios
(74) *Attorney, Agent, or Firm*—Oblon, Spivak, McClelland, Maier & Neustadt, P.C.

(57) ABSTRACT

A power production unit onboard a motor vehicle, including a fuel cell including at least one orifice for evacuating off-gases, in particular of air and water vapor, which are discharged into a discharge pipe. A condenser liquefies the water vapor, and a compressor is interposed upstream of the condenser, liquid water being diverted from the discharge pipe to a liquid water circuit. The compressor compresses the off-gases so that the dew point of the water vapor is higher than the temperature of the condenser.

9 Claims, 1 Drawing Sheet

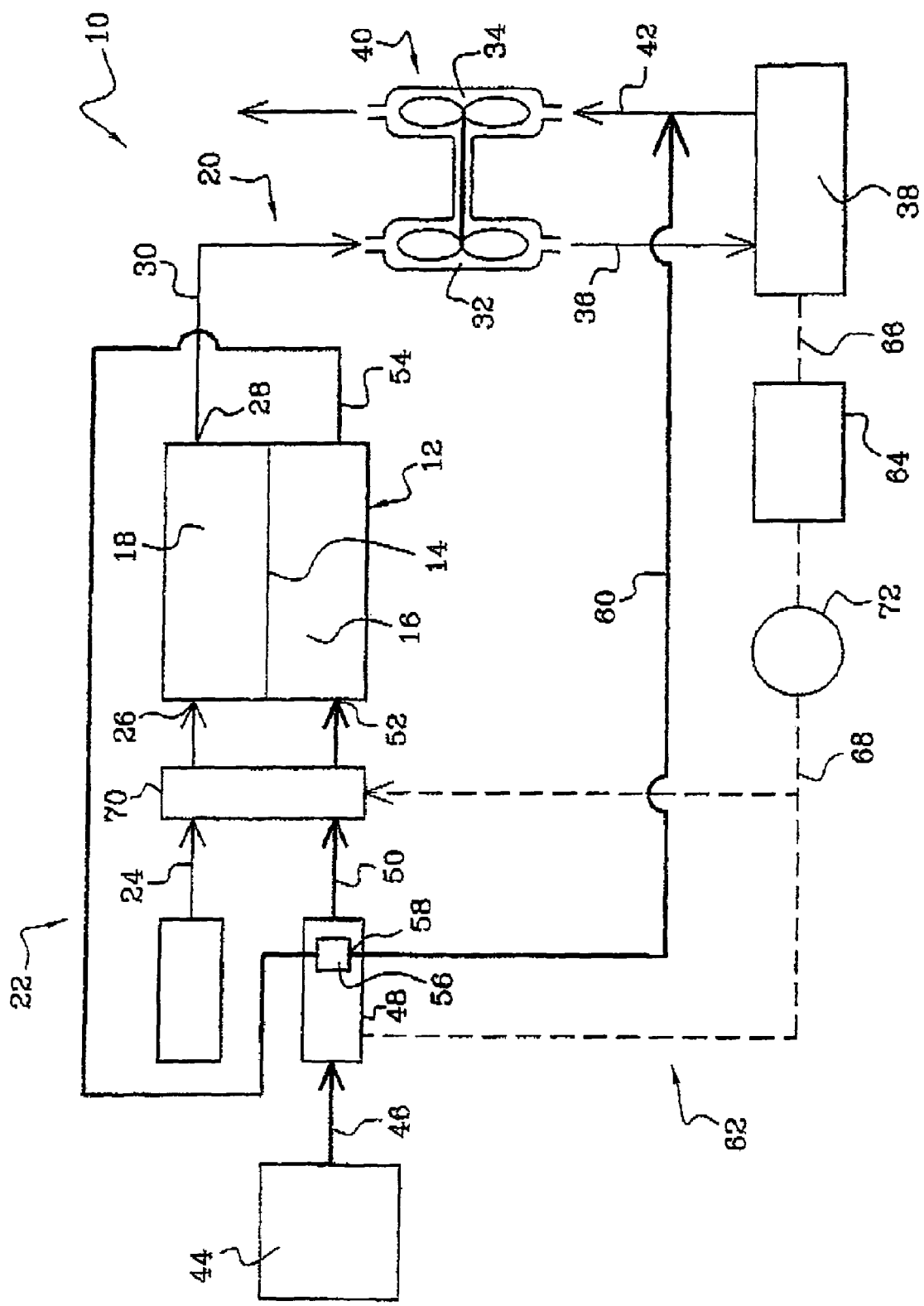

DEVICE FOR RECUPERATING WATER IN A POWER PRODUCTION UNIT COMPRISING A FUEL CELL

BACKGROUND OF THE INVENTION

1. Field of the Invention

The invention relates to an electricity-generating installation on board a motor vehicle, of the type equipped with a fuel-cell stack.

The invention relates more particularly to an electricity-generating installation on board a motor vehicle, of the type equipped with a fuel-cell stack provided with at least one orifice for evacuation of residual gases, which are composed mainly of air and water vapor and which are discharged into an evacuation conduit in which there is disposed a condenser that liquefies the water vapor, and in which a compressor is interposed upstream from the condenser, the liquid water being diverted from the evacuation conduit to a liquid water circuit.

2. Description of Related Art

Fuel-cell stacks are used in particular to supply the electrical energy necessary for propulsion of motor vehicles. The fuel-cell stack is then mounted on board the vehicle.

A fuel-cell stack is composed mainly of two electrodes, an anode and a cathode, which are separated by an electrolyte. This type of stack permits direct conversion, to electrical energy, of the energy produced by the following oxidation-reduction reactions:

a reaction of oxidation of a fuel, which continuously feeds the anode; and a reaction of reduction of an oxygen carrier, which continuously feeds the cathode.

The fuel-cell stacks used to supply electrical energy on board motor vehicles are generally of the solid-electrolyte type, especially with an electrolyte formed by a polymer membrane. Such a stack uses especially hydrogen ($H_2$) and oxygen ($O_2$) as the fuel and oxygen carrier respectively.

In contrast to combustion engines, which discharge a non-negligible quantity of polluting substances with the exhaust gases, the fuel-cell stack offers in particular the advantage of discharging mainly water, which is produced by the reduction reaction at the cathode.

The stack also discharges part of the oxygen carrier that has not reacted in the form of cathode evacuation gas, and it may also discharge part of the fuel that has not reacted in the form of anode evacuation gas. In the latter case, the fuel is generally burned before being discharged to the atmosphere in the form of water vapor.

In addition, the oxygen carrier of a stack of the type described in the foregoing can be ambient air, the oxygen ($O_2$) of which undergoes reduction.

The oxygen carrier is generally humidified before being injected at the cathode, so that the membrane of polymer material is not damaged, for example by drying. This humidification operation is also applied to the fuel when the latter leaves the anode via an anode evacuation orifice.

The water necessary for humidification of the membrane is generally recovered at the stack outlet, and more particularly in the cathode evacuation gases, which contain water in liquid or vapor form, produced by the reaction of reduction of the oxygen carrier at the cathode.

Water recovery at the cathode outlet effectively has the advantage that there is no need for frequent replenishment of the water reserves of the vehicle. In addition, if sufficient water can be recovered to humidify the membrane, it is not necessary that the vehicle be equipped with a large-volume water reservoir.

To recover the water produced at the cathode, it is known that a condenser can be disposed in the stream of cathode evacuation gas. For optimal operation of the fuel-cell stack being fed with oxygen carrier and fuel under atmospheric pressure, this type of condenser generally requires a cooling source, whose temperature must be maintained between 20 and 30° C.

This solution is not usable, because motor vehicles are generally designed to operate in an environment whose temperature may vary between −20° C. and approximately 45° C. The use of a condenser therefore necessitates the use of a costly air-conditioning device, which is not available in all vehicle models.

It is known, therefore, to raise the oxygen-carrier pressure in the cathode circuit while retaining the condenser. By raising the pressure of the evacuation gases containing the water vapor, the dew point temperature of the water vapor is also effectively raised. The dew point temperature is the temperature at which the water vapor condenses. A condensation fog is then deposited on the surfaces whose temperature is lower than the dew point.

Thus, when the evacuation gases are injected into the condenser, at a pressure of 4 bar, for example, the cooling source of the condenser must then be maintained at a temperature of approximately 60° C. in order to function in optimum manner. It is much easier to maintain the cooling source of the condenser at a higher temperature than the ambient temperature.

However, such a solution requires that all feed circuits of the fuel-cell stack be kept under pressure, with the risk of degradation of the said stack. It is therefore necessary to use a non-negligible portion of the energy supplied by the stack to compress the oxygen-carrier and fuel circuits, to the detriment of the efficiency of the fuel-cell stack.

SUMMARY OF THE INVENTION

To overcome these problems, the invention proposes an electricity-generating installation on board a motor vehicle, which installation is of the type described in the foregoing, characterized in that the compressor compresses the residual gases in such a way that the dew point temperature of the water vapor is higher than the temperature of the condenser.

According to other characteristics of the invention:

the installation is provided with a turbine, which is interposed in the evacuation conduit downstream from the condenser and which drives the compressor;

the turbine and the compressor comprise a turbine compressor;

the installation includes a reformer, which feeds the fuel-cell stack with fuel and which discharges the exhaust gases under pressure and injects them into the turbine.

The invention also relates to a method for electricity generation on board a motor vehicle, of the type equipped with a fuel-cell stack, the method operating by liquefying the water vapor by a condenser disposed into an evacuation conduit in which the residual gases are discharged via at least one orifice for evacuation of the residual gases, which are composed mainly of air and water vapor; by diverting the liquid water from the evacuation conduit to a liquid water circuit; and by compressing the residual gases by the compressor in such a way that the dew point temperature of the water vapor is higher than the temperature of the condenser.

The present invention is applicable to a vehicle equipped with such an electricity-generating installation or using such a method.

BRIEF DESCRIPTION OF THE DRAWINGS

FIG. 1 illustrates an exemplary electricity-generating installation.

DETAILED DESCRIPTION OF THE PREFERRED EMBODIMENTS

Other characteristics and advantages of the invention will become evident upon reading the detailed description hereinafter, for the understanding of which reference will be made to the single attached figure, which is a schematic representation of the electricity-generating installation constructed according to the teachings of the invention.

FIG. 1 illustrates an electricity-generating installation 10, which in the present case is mounted on board a motor vehicle. Installation 10 is provided mainly with a fuel-cell stack 12, the electrolyte of which in the present case is a polymer membrane 14.

Fuel-cell stack 12 is provided with an anode 16 and a cathode 18. Cathode 18 is fed continuously by an oxygen carrier, which in the present case is air. Anode 16 is fed continuously by a fuel, which in the present case is mainly hydrogen ($H_2$). The flowrates of oxygen carrier and fuel are in the present case regulated as a function of the electrical power required for the motor vehicle.

Fuel-cell stack 12 is traversed by a first cathode circuit 20 of oxygen carrier as illustrated by a thin continuous line in FIG. 1, and it is traversed by a second anode circuit 22 of fuel as illustrated by a thick continuous line.

Cathode circuit 20 is provided in particular with a cathode feed conduit 24, which is connected to a cathode feed orifice 26 in order to feed cathode 18 with air. Cathode 18 is provided with a cathode evacuation orifice 28, via which the cathode evacuation gases or residual gases, or in other words the gases that have not been consumed by the cathode, are evacuated into a cathode evacuation conduit 30.

Cathode evacuation conduit 30 is connected to a compressor 32, which in the present case is driven mechanically by a turbine 34. Compressor 32 is designed to compress the cathode evacuation gases, which are then guided via a water-recovery conduit 36 to a condenser 38. Turbine 34 and compressor 32 in the present case comprise a turbine compressor 40.

Condenser 38 is intended to collect the liquid water contained in the compressed cathode evacuation gases.

After passage into condenser 38, the cathode evacuation gases are then expelled into the atmosphere via a gas-expulsion conduit 42 in which turbine 34 is interposed.

Anode circuit 22 is provided in particular with a reservoir 44 containing a customary fuel, which in the present case is gasoline and which is situated upstream from anode 16. The gasoline is guided via a gas-transport tube 46 from reservoir 44 to a reformer 48, which is designed to extract the hydrogen ($H_2$) from the gasoline.

Reformer 48 discharges a reformate containing hydrogen ($H_2$) into an anode feed tube 50, which is connected to an anode feed orifice 52, which opens into anode 16 of fuel-cell stack 12.

After part of the hydrogen ($H_2$) has been consumed, the residual fuel is in the present case injected via an anode evacuation tube 54 into a burner 56, which in the present case is integrated into reformer 48, in order to be burned therein.

The exhaust gases resulting from this operation are then evacuated via an exhaust orifice 58 of burner 56 into an exhaust tube 60 of burner 56, which tube is connected to expulsion conduit 42 upstream from turbine 34. After their passage into turbine 34, the exhaust gases are thus discharged into the atmosphere together with the cathode evacuation gases.

Installation 10 is also provided with a water-distribution circuit 62, which is illustrated by a broken line in the figure. Water-distribution circuit 62 is provided with a water reservoir 64. Water reservoir 64 is fed with water by condenser 38 via a water flow conduit 66.

The water recovered by condenser 38 is then distributed via a water-distribution system 68 to reformer 48 as well as to a device 70 for humidifying the fuel and the oxygen carrier, which device is disposed in cathode feed conduit 24 and in anode feed tube 50. The distribution of water is achieved in the present case by means of a water pump 72.

We will now describe the operation of such an installation 10, and in particular the operation of the water-recovery device.

In anode circuit 22, the gasoline is passed into reformer 48 via gasoline-transport tube 46. The product of the reforming operation is known as "reformate".

The reformate is composed mainly of hydrogen ($H_2$), carbon monoxide (CO), carbon dioxide ($CO_2$), nitrogen ($N_2$) and water ($H_2O$). The reformate is the fuel that feeds anode orifice 52 via anode feed tube 50.

In the present case it is injected at anode 16 under a pressure of approximately 1 bar after passage into the humidification device.

In cathode circuit 20, the atmosphere air is admitted into cathode feed conduit 24. The air, which in the present case is at atmospheric pressure, or in other words approximately 1 bar, is then introduced to cathode 18 via cathode feed orifice 26 after passage into the humidification device.

Fuel-cell stack 12 is then fed with fuel and with oxygen carrier. Oxidation reactions at anode 16 and reduction reactions at cathode 18 then permit the generation of electrical energy.

When the fuel is in contact with anode 16, 70% to 95% of the hydrogen ($H_2$) is oxidized in the present case. The remainder of the fuel is discharged in the form of anode evacuation gas to burner 56 via anode evacuation tube 54.

During contact of the air with cathode 18, a portion of the oxygen ($O_2$) contained in the air is reduced to water. The surpluses of air and water are then evacuated in the form of cathode evacuation gas via cathode evacuation conduit 30 to compressor 32. The water is present in the cathode evacuation gases in the form of liquid and in the form of vapor. The cathode evacuation gases in the present case have a temperature of approximately 70° C.

The cathode evacuation gases then contain the water in the form of liquid and vapor.

In compressor 32, the cathode evacuation gases are then compressed to a pressure of 4 bar, for example, such that the dew point temperature of the water vapor, as explained hereinabove, is higher than the temperature of condenser 38, or in other words approximately 60° C.

After compression, the cathode evacuation gases are injected into condenser 38. Condenser 38 is maintained at a temperature below the dew point temperature of water, so that the water contained in the cathode evacuation gases is completely liquefied.

The water is then diverted to water reservoir 64 via water-flow conduit 66.

After passage into condenser 38, the cathode evacuation gases are injected into turbine 34.

Advantageously, turbine 34 and compressor 32 are situated close to condenser 38, so that the cathode evacuation gases arriving at turbine 34 suffer only small pressure losses. Thus the cathode evacuation gases are capable of supplying a non-negligible portion of energy for driving compressor 32.

Exhaust tube 60 of burner 56 is in the present case connected to turbine 34, in order to furnish additional energy sufficient for compressor 32 to compress the cathode evacuation gases to the desired pressure.

With such an installation 10, it is not necessary to pressurize the entire fuel-cell stack 12, which leads to non-negligible pressure losses between compressor 32 and turbine 34.

The invention claimed is:

1. An electricity-generating installation on board a motor vehicle, comprising:
    a fuel-cell stack provided with at least one orifice for evacuation of residual gases, which are composed mainly of air and water vapor and which are discharged into an evacuation conduit in which there is disposed a condenser that liquefies the water vapor;
    a compressor interposed directly upstream from the condenser such that the residual gases are transferred from the compressor to the condenser; and
    a turbine interposed in the evacuation conduit downstream from the condenser and which drives the compressor, wherein
    the liquid water is diverted from the evacuation conduit to a liquid water circuit,
    the compressor compresses the residual gases such that a dew point temperature of the water vapor is higher than a temperature of the condenser, and
    the turbine is interposed in the evacuation conduit directly downstream from the condenser such that the residual gases are transferred from the condenser to the turbine.

2. An installation according to claim 1, wherein the turbine and the compressor comprise a turbine compressor.

3. An installation according to claim 1, further comprising a reformer, which feeds the fuel-cell stack with fuel and which discharges the exhaust gases under pressure and injects the exhaust gases into the turbine.

4. A vehicle comprising:
    an electricity-generating installation according to claim 1.

5. An installation according to claim 1, wherein a pressure in the compressor is 4 bar.

6. An installation according to claim 1, wherein
    the liquid water circuit includes a water reservoir and a pump, and
    the liquid water circuit is configured to supply the liquid water to a reformer and a humidifying device.

7. A method for electricity generation on board a motor vehicle, equipped with a fuel-cell stack, the method comprising:
    discharging residual gases into an evacuation conduit via at least one orifice for evacuation of the residual gases, the residual gases being composed mainly of air and water vapor;
    compressing the residual gases by a compressor such that a dew point temperature of the water vapor is higher than a temperature of a condenser;
    liquefying the water vapor discharged from the compressor by the condenser disposed directly downstream from the compressor;
    diverting the liquid water from the evacuation conduit to a liquid water circuit; and
    driving the compressor with a turbine interposed in the evacuation conduit downstream from the condenser,
    wherein the turbine is interposed in the evacuation conduit directly downstream from the condenser such that the residual gases are transferred from the condenser to the turbine.

8. A method according to claim 7, wherein the compressing the residual gases includes compressing the residual gases with a pressure in the compressor of 4 bar.

9. A method according to claim 7, further comprising:
    supplying a reformer and a humidifying device with the liquid water diverted to the liquid water circuit.

* * * * *